INVENTORS:
WILLIAM L. ROEVER
NOYES D. SMITH, JR.

THEIR ATTORNEY

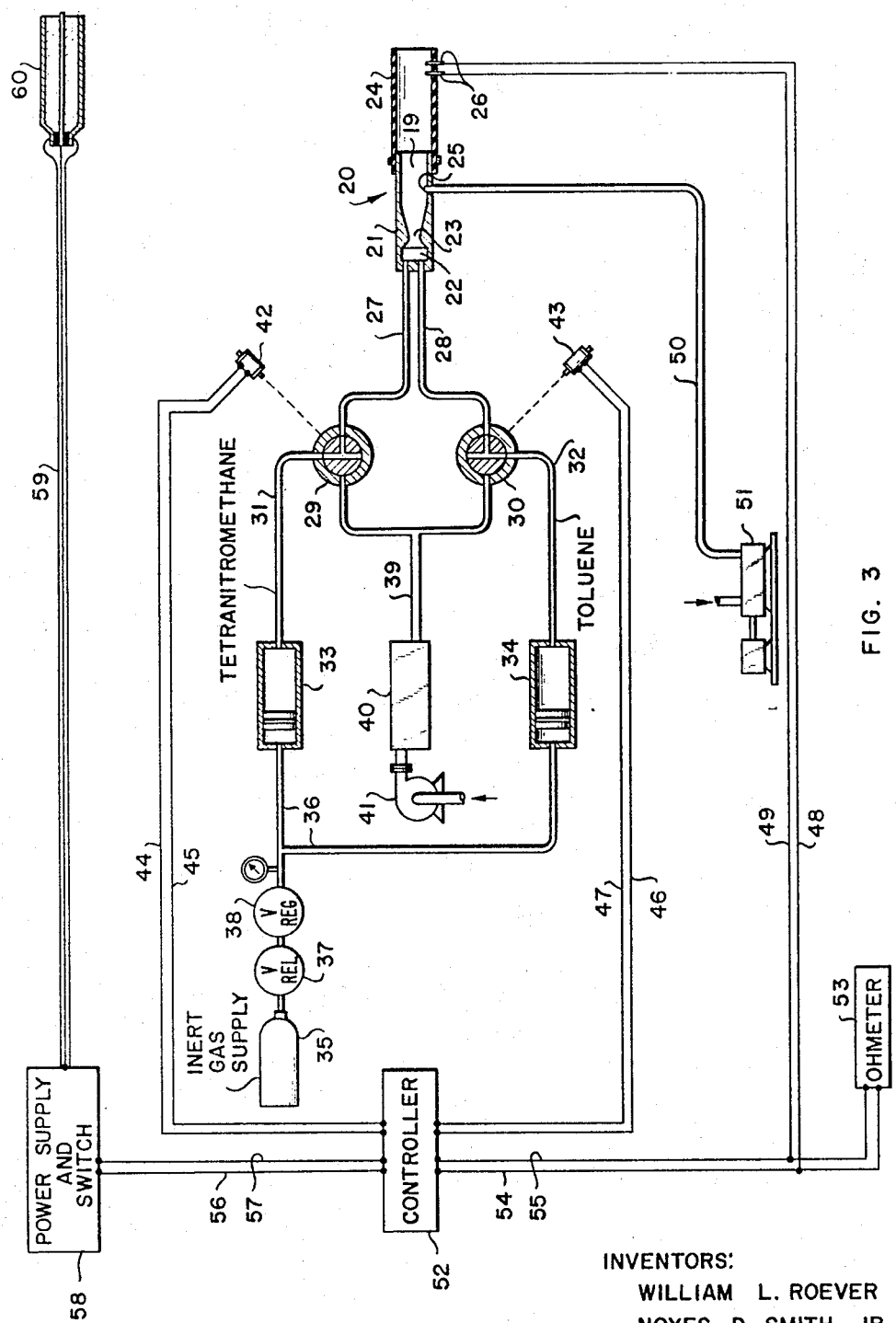

United States Patent Office 3,382,946
Patented May 14, 1968

3,382,946
LIQUID SEISMIC EXPLOSIVE AND METHOD OF USING
Noyes D. Smith, Jr., and William L. Roever, Bellaire, Tex., assignors to Shell Oil Company, New York, N.Y., a corporation of Delaware
Filed Oct. 20, 1966, Ser. No. 588,053
10 Claims. (Cl. 181—.5)

ABSTRACT OF THE DISCLOSURE

A source of seismic energy for exploring water-covered areas wherein materials that are relatively explosively insensitive are mixed to form a sensitive water-immiscible liquid explosive. The mixed materials are discharged into the water and detonated to generate seismic waves.

---

This invention relates to an apparatus and method of seismic prospecting for geological structures disposed beneath a body of water and pertains more particularly to a method and apparatus of imparting energy to a body of water and to the ground below it for seismic prospecting purposes wherein a substantially continuous line of explosive is detonated in a manner to control the direction of downward travel of maximum seismic energy.

One of the more commonly employed methods of surveying geological formations in water-covered areas is described in U.S. Patent 2,465,696 to L. R. C. Paslay. In this method seismic signals are initiated from an explosive charge lowered into a body of water from a moving vessel and fired by control means from the vessel when the vessel has proceeded along a predetermined course for a distance sufficient to cause a flexible, elongated streamer having a plurality of piezoelectric seismometers arranged at intervals therein to be positioned above or to one side of the explosion. The pressure applied to the seismometers by the surrounding water in response to seismic signals reflected from subsurface geological formations and tectonic structures within the earth beneath the explosion causes voltage signals to be generated by the seismometers corresponding respectively to the seismic signals received thereby. These electric signals are amplified and recorded on a moving tape or chart on the vessel in timed-spaced relation with respect to a start signal recorded thereon as the firing circuit for the initial explosion is closed, the exact geophysical location of the explosion being determined by signals received from a plurality of sono-buoys moored within the vicinity of the explosion, and recorded on the moving chart.

Customarily, the foregoing seismic mapping operation is performed with two vessels. The function of one of the vessels is to carry and operate the aforedescribed sensing and recording equipment and to tow an array of seismometers operatively connected to said equipment. The second vessel, for safety reasons, follows the seismometer array of the first vessel and at intervals launches explosives, such as dynamite, attached to a shooting cable. When the explosive charge is far enough away from the second vessel so that no damage will be sustained, it is fired. Usually, the charges are supported by a balloon serving as a buoy so that the charge is kept at a chosen desired depth. The problem of priming, capping, connecting a shooting line, attaching a buoy and launching a charge every four or five minutes is a severe one. In carrying out these operations at a fast pace, the chance of accidents is increased. When the loading operations are performed from the recording vessel so as to eliminate the need for a second vessel, the hazards are greatly increased. In addition, it would be desirable to fire charges at an even faster rate.

One of the objects of our invention, therefore, is to provide rapid and complete automation of the loading and firing of seismic charges.

Another object of our invention is to provide improved seismic record interpretation by using more frequent and/or more directional high-energy impulses along a given survey line.

Still another object of our invention is to eliminate the necessity for assigning two or more vessels to a seismic survey crew.

A further object of our invention is to eliminate the danger in handling explosive materials necessary for seismic explosions by delaying the creation of a high-energy explosive charge until immediately prior to underwater detonation at a location remote from the seismic survey vessel.

An additional object of our invention is to eliminate the danger of explosive charges or detonators being washed up on a beach by providing an explosive having a short lifetime in water and avoiding the use of detonator caps.

Another object of our invention is to provide a sound source apparatus for use in seismic surveying over water-covered areas wherein most of the energy transmitted by the sound source is in frequencies of interest to seismic surveying.

A still further object of our invention is to provide a linear sound source for use in seismic surveying operations, which sound source does not produce either the very high or low frequencies which are undesirable in seismic prospecting.

Further objects of the present invention will be understood from the following description taken with regard to the drawings, wherein:

FIGURE 3 is a schematic detail of the explosive planting system in accordance with the present invention.

Figure 1:
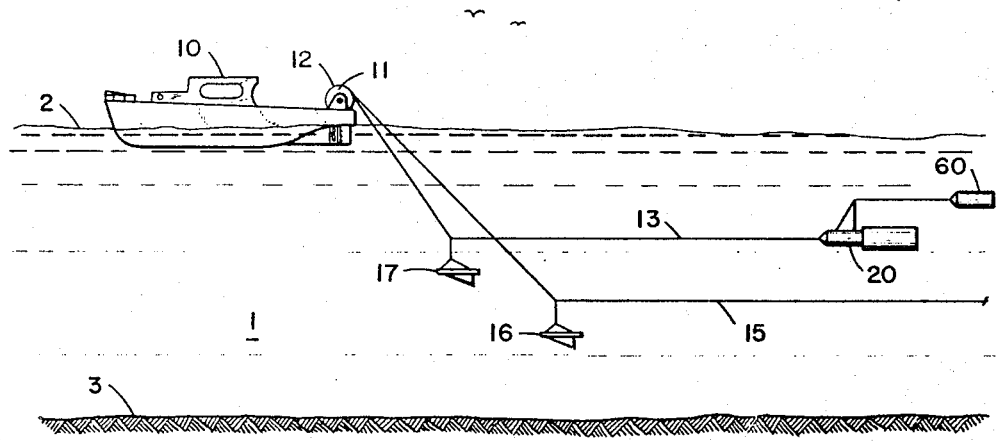
FIGURE 1 is a schematic elevational view showing the relative positions of a towing vessel, the seismometer streamer and an explosive planter in accordance with the present invention.
Figure 2:
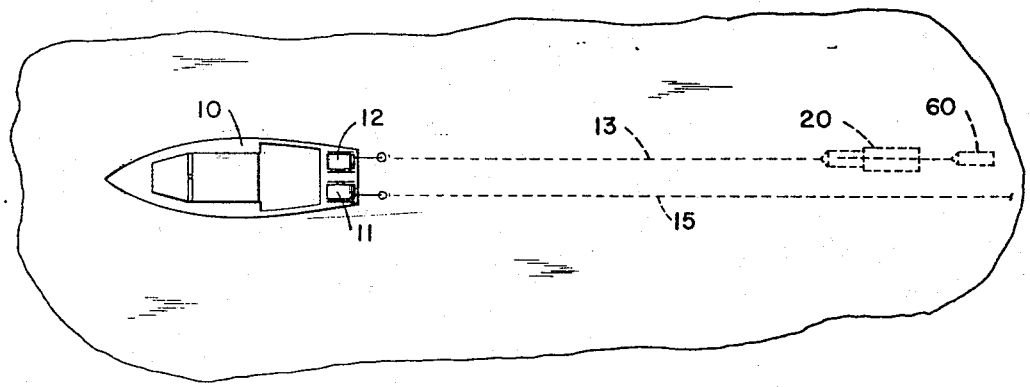
FIGURE 2 is a schematic plan view of the invention illustrated by FIGURE 1.

Reference to FIGURES 1 and 2 shows an arrangement of the equipment required for the practice of this invention relative to a tow vessel 10 shown to be floating on the surface 2 of a body of water 1. The two vessel 10 is provided with a reel 11 for storing and selectively paying out a detector streamer 15 which comprises a flexible cable having a plurality of seismometers or hydrophones mounted therein or thereon in spaced relation along the length thereof. The tow vessel is also provided with reel 12 for storing and paying out the tow line 13 for an explosive planter 20 and sparking device 60. The tow line 13 comprises a flexible tow cable, explosive constituent hoses 31 and 32 (FIGURE 3), water hose 39 and may, in the illustrated embodiment, also include an air hose 50. Both the streamer 15 and the tow line 13 are preferably designed with a neutral buoyancy so that they will stream out behind the weighing devices 16 and 17, respectively in a horizontal position at a constant depth in the water. The streamer 15 is laterally near the explosive planter 20 but sufficiently far away as to not sustain damage by the detonation of explosive charges therefrom.

The FIGURE 3 schematic illustration of the explosive planter 20 and operationally relevant appurtenances shows the planter to be comprised of a housing 21 having a mixing chamber 22 and mixing orifice 23. Attached to the discharge end of the discharge chamber 19 is a flexible sleeve 24 having environmental resistance sensitive electrodes 26 mounted therein. Communicating with the mixing chamber 22 remote from the orifice 23 are fluid conduits 27 and 28. Both the conduits 27 and 28 are respectively attached to one port of three-way solenoid control valves 29 and 30. Another port of the valves 29 and 30 is connected to the water hose 39. The water supply conduit may also include a water pump 41 and surge tank 40.

The third port of the valve 29 and 30 receives the delivery end of the explosive constituent hoses 31 and 32. Such constituents, tetranitromethane and toluene, for example, may be energized for delivery by any known means such as floating piston accumulators 33 and 34. A charge of explosive constituent is energized by the pressure of an inert gas acting on the side of free-floating accumulater pistons opposite from the said constituent charge. The inert gas pressure may be supplied through conduit 36 from a bottle source 35 and controlled by regulator valve 38 and safety valve 37.

Each control valve 29 and 30 may be provided with a solenoid actuator 42 and 43, respectively, receiving electrical energy through electrical conduits 44, 45 and 46, 47, respectively. The emission of such energy through the conduits 44 through 47 is controlled by controller 52 in response to electrical impulses received from electrodes 26 via conduits 48, 49, 54 and 55.

The electric control system is provided with power by a power supply 58, which may be a generator or battery, through power supply leads 56 and 57.

Depending on the sensitivity nature of the liquid explosive used, a relationship to be subsequently explained, the discharge chamber 19 of the explosive planter 20 may be provided with an air nozzle 25. Compressed air is provided through the nozzle hose 50 from an air compressor 51.

Also dependent upon the sensitivity nature of the liquid explosive used, the seismic apparatus may be provided with an underwater electrical sparking apparatus 60 of known and conventional design. The sparking apparatus 60 is sized to emit a spark of such intensity as is dictated by such parameters desecribed hereinbelow. Electrical power is supplied to the spark apparatus by a coaxial cable 59 connected to the power source 58.

Broadly, this invention comprehends the use of at least two fluids, neither of which is explosively sensitive. The two fluids are carried separately aboard the survey vessel and are pumped through individual hoses 31 and 32 to the explosive planter 20 where they are mixed to form a sensitive brisant explosive liquid. Two suitable liquids for carrying out this process are tetranitromethane and toluene. Neither of these liquids, by themselves, are sensitive explosives. However, when the two are mixed in the ratio of 15 to 50 percent toluene, a highly brisant heat-sensitive explosive is obtained.

An explosive liquid charge may also be formed from a suitable gas and liquid or two or more suitable gases so long as the combined result of the constituents is to form, in the mixing chamber, an explosive, liquid state, mixture or compound, it being a fundamental premise of this invention to present as much explosive energy as possible in a fluid form that is immiscible or is slowly miscible in water. Moreover, a gaseous explosive charge will invariably have a specific gravity substantially less than water. A liquid charge, on the other hand, may be formed with a specific gravity that very closely approximates or equals that of water and will consequently remain at the same depth as it is released or rise or settle very slowly. This relatively free suspension of the charge in the water will allow a large and rather extended body of the explosive charge to be planted before detonation.

The dispersal rate of the explosive charge after planting may be substantially inhibited by the inclusion of appropriate amounts of a compound from the class including the oil soluble salts of fatty acids similar to those used in gelling gasoline to make napalm with one or more of the explosive constituents. Such compounds serve to preserve the concentrational integrity of the charge after its free suspension in the water, thereby tending to "waterproof" same.

According to the publication, "The Detonation of Liquid Explosives," by Bowden, Mulcahy, Vines and Yoffe published in the Proceedings of the Royal Society, Section A. p. 291 (1947), a variety of liquids may be made sensitive to detonation by shock by injecting small bubbles of air into the liquids. The mechanism of this increase in shock sensitivity was shown to be the high temperture reached in the bubbles by their adiabatic compression due to the pressure of the shock.

Pursuant to these teachings, therefore, one way to "arm" the explosive mixture is to aerate it with such small bubbles of air. Detonation is obtained by discharging high-energy electric sparks in the water at close proximity to a free-floating consolidated mass of the aerated explosive. Compression waves emanating from the spark through the water therefore impinge upon said mass to compress the air bubbles, thereby detonating said mass.

Sequentially, the foregoing process is performed with the aforedescribed apparatus in the following manner. When a charge is desired, valves 29 and 30 are opened by solenoid operators 42 and 43 to permit explosive constituents, tetranitromethane and toluene, for example, to flow from hoses 31 and 32, respectively. The fluids are joined together in a mixing chamber 22 and are passed through the orifice 23 into the discharge chamber 19 past the air jet 25 which injects bubbles of air into the mixture. The aerated explosive mixture flows from the discharge end of the discharge chamber 19 into the flexible sleeve 25 and past the electrodes 26. A change in the resistance across the electrodes 26 indicates the explosive liquid has passed out into the water. Such resistance change is indicated by the ohmmeter 53 and sensed by the valve controller 52 so that when a sufficiently large charge has been mixed, valves 29 and 30 are operated to cut off the flow from hoses 31 and 32 and to connect the mixing chamber to water hose 39 so that the mixing chamber 22 will be purged of explosive liquid which is pushed out past the electrode 26 into the water. After a delay sufficient to allow the explosive mixture to separate far enough away from the equipment so that the explosion will not damage same, a spark from the apparatus 60 is discharged and the explosive mixture detonated.

In order to estimate the distance at which the spark of the sparking apparatus 60 must be from the explosive mixture to detonate same, the pressure produced at a given distance by an independently selected spark intensity will be estimated and the temperature reached in the air bubbles calculated. From p. 133 in the publication, "Underwater Explosions," by Robert Hugh Cole, the peak pressure $P_m$ generated by a weight $W$ of explosive at a distance $R$ is given by:

$$P_m = \frac{14,000 W^{1/3} e^{0.274 \frac{W^{1/3}}{R}}}{R}$$

where:

$P_m$ is in lb./in$^2$.
$W$ is in lbs.
$R$ is in ft.

$$\text{for small } w, \; e^{0.274 \frac{W^{1/3}}{R}} = 1$$

High-intensity sparks underwater are common which supply energy equivalent to or greater than 0.01/lb. of explosive.

Then:

$$P_m = \frac{14,000(.01)^{1/3}}{R}$$

$$= \frac{3017}{R} \text{ lb./in.}^2$$

If $R = 1$ ft., $P_m = 3017$ lb./in.$^2$ $$T_m = T_o \left(\frac{P_m}{P_o}\right)^{\frac{\partial-1}{\partial}}$$

For air, $$\partial = 1.4 \text{ and } \frac{\partial-1}{\partial} = \frac{.4}{1.4} = .286$$

Where the bubble temperature is 20° F. and the charge depth is approximately 10 ft.;

$$T_m = (273+20)\left(\frac{3017}{14.7+5.3}\right)^{.286}$$
$$= (293)\left(\frac{3017}{20}\right)^{.226}$$
$$T_m = 1239° \text{ Absolute}$$
$$= (1239-271)°C.$$
$$= 966°C.$$

This temperature is probably sufficient to insure detonation of the explosive mixture. However, the sensitivity can be increased by using oxygen for the bubble instead of air. Furthermore, it is also possible to aerate the liquid explosive charge with a gaseous mixture of hydrogen and chlorine or other photochemically reactive mixture which would react from the ultra-violet light emitted by the spark or by sunlight at shallow depths.

From the above it is seen that the resistance indicated on electrodes 26 signals the presence of water or explosive mixture within the flexible tube 24. Such signals are received by the controller 52 which programs the application of power to the solenoid actuators 42 and 43 for valves 29 and 30 through the electro conduits 44 through 47. Preferably, the controller 52 is programmed to carry out the complete cycle of mixing, placing and automatically firing a single or series of charges of predetermined intensity. Furthermore, in order to distribute the charge and keep the main body of same at a large distance from the apparatus of the explosive planter and the sparking device, the explosive mixture may be alternated with slugs of water to produce a series of small charges. The spark can be placed quite close to the last of the small charges where detonation of said last small charge would be assured. The shock wave from the detonation of this small charge would propagate to the other charges since the energy in said small charge would be much greater than the energy in the spark but not so great as to damage the planting apparatus. The main charge, however, may be continuous and of much greater intensity.

We claim as our invention:
1. A method of generating underwater seismic impulses comprising the steps of:
 forming a sensitive water immiscible liquid explosive charge by mixing materials that are individually relatively explosively insensitive in a chamber located beneath the surface of a body of water;
 purging said chamber to exhaust therefrom said explosive charge as a freely suspended explosive mass in said body of water;
 sensing the discharge of said explosive charge from said chamber;
 providing energy of a form to which said charge is explosively sensitive; and
 bringing said charge and said energy into proximity with one another so as to detonate said charge at a predetermined depth below the surface of said body of water.

2. The method of claim 1 which includes:
 entraining bubbles of gas in said liquid charge, said energy being compression waves emanated through said body of water whereby said gas is adiabatically compressed to a temperature sufficient to ignite said explosive mass.

3. The method of claim 2 wherein said forming step comprises the mixing of tetranitromethane and toluene.

4. An apparatus for generating underwater seismic impulses comprising:
 mixing chamber means having discharge port means therein, said chamber means being adapted to be moved through a body of water beneath the surface thereof;
 first conduit means in communication with said chamber for conducting a predetermined quantity of explosive constituent fluids to said chamber means to form an explosive charge therein;
 second conduit means adapted to communicate with said chamber for conducting fluid to purge said chamber;
 fluid sensing means in said chamber between said conduits and said discharge end, said sensing means being capable of sensing the exit of said charge from said chamber;
 detonating energy generating means located in close but separate proximity of said discharge port means; and
 circuit means for activating said generating means to emanate explosive charge detonating energy.

5. The apparatus of claim 4 wherein said charge is sensitive to heat.

6. The apparatus of claim 5 which includes third conduit means for conducting gas to said chamber for entrainment with said charge, said generating means emanating shock waves through said body of water to adiabatically compress said gas, thereby heating same sufficiently to ignite said charge.

7. The apparatus of claim 6 wherein said generating means is an electric spark discharge means.

8. The apparatus of claim 6 wherein said explosive constituent fluids comprise tetranitromethane and toluene and said gas is air.

9. The apparatus of claim 4 wherein said charge is sensitive to light.

10. The apparatus of claim 9 wherein said explosive constituent fluids comprise hydrogen and chlorine.

References Cited

UNITED STATES PATENTS

| | | | |
|---|---|---|---|
| 2,704,515 | 3/1955 | Barlow | 102—23 |
| 3,176,787 | 4/1965 | Roever | 181—0.5 |
| 3,187,831 | 6/1965 | Smith. | |
| 3,246,286 | 4/1966 | Barry. | |
| 3,251,027 | 5/1966 | Huckabay et al. | |
| 3,276,534 | 10/1966 | Ewing et al. | |
| 3,288,064 | 11/1966 | Gongwer | 102—22 |
| 3,292,140 | 12/1966 | Angona et al. | |

OTHER REFERENCES

Bowden et al., "The Detonation of Liquid Explosives by Gentle Impact"; Proc. of the Royal Society of London; Series A; v. 188; May 1946; pp. 291–292, 304, 306–309.

BENJAMIN A. BORCHELT, *Primary Examiner.*

W. KUJAWA, *Assistant Examiner.*